J. S. WHITTEN.
ANTIFREEZING DEVICE.
APPLICATION FILED JAN. 12, 1918.
1,289,991.
Patented Dec. 31, 1918.
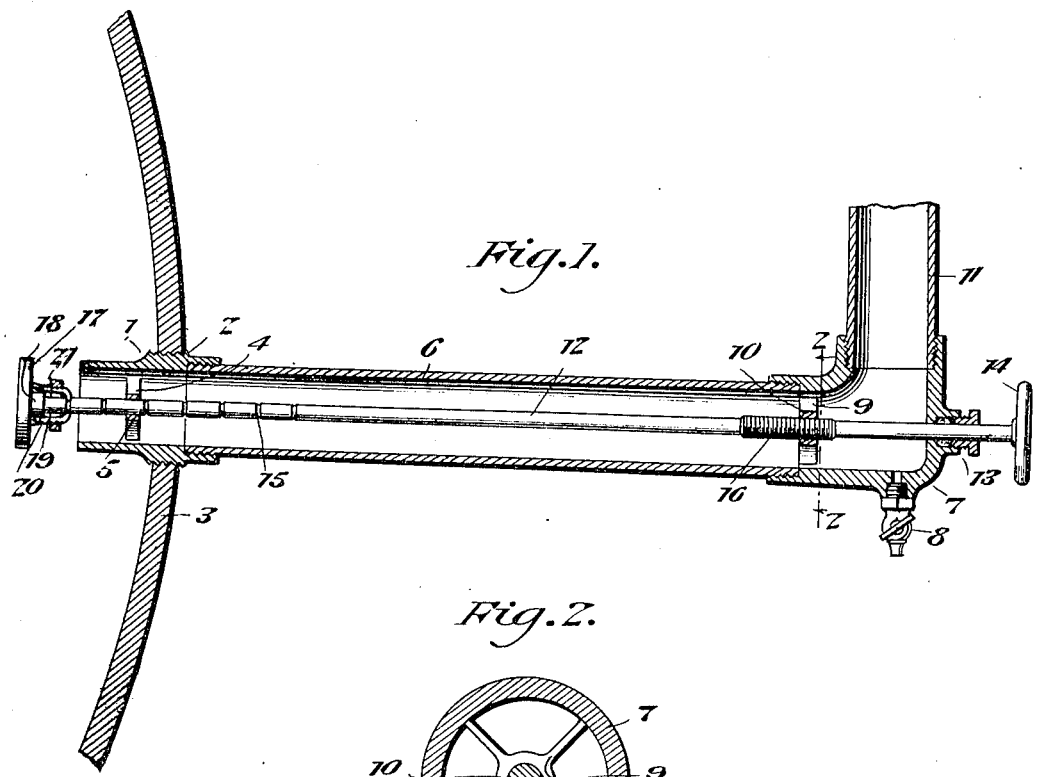
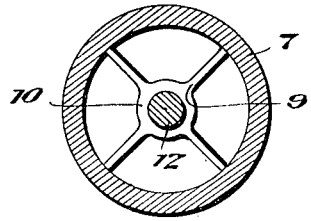
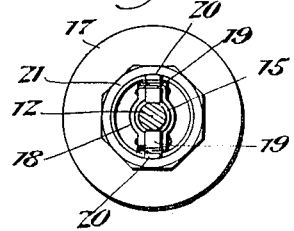
Witnesses
Inventor
John S. Whitten
By Victor J. Evans
Attorney

UNITED STATES PATENT OFFICE.

JOHN S. WHITTEN, OF CONWAY, ARKANSAS.

ANTIFREEZING DEVICE.

1,289,991.

Specification of Letters Patent.

Patented Dec. 31, 1918.

Application filed January 12, 1918. Serial No. 211,592.

*To all whom it may concern:*

Be it known that I, JOHN S. WHITTEN, a citizen of the United States, residing at Conway, in the county of Faulkner and State of Arkansas, have invented new and useful Improvements in Antifreezing Devices, of which the following is a specification.

This invention relates to anti-freezing devices adapted to be applied to water pipes and it consists in the novel features hereinafter described and claimed. A primary object of the invention is to provide a device of the character stated which is especially adapted to be used for application to the pipe which leads from a boiler to the water gage and when applied may be manipulated to drain the pipe and gage when the boiler is not in use whereby the water is prevented from freezing in the pipe, or in the event that the device is not drained the parts may be manipulated for breaking up any ice that might form in the pipe prior to heating the boiler.

With this object in view the device comprises a nipple which is threaded in the side of the boiler. A spider is located within the nipple and carries a bearing which is centrally positioned with relation to the nipple. An elbow is attached to the other end of the said pipe and is provided with an internally located spider having an internally threaded centrally positioned bearing. A water column pipe is connected with the elbow and may be connected with the water gage in a usual manner. The said elbow is provided at its lowest point with a drain cock of conventional pattern. A stem is journaled in the bearings and that part of the stem which is located in the elbow is provided with a thread which engages the thread at the bearing located in the elbow. The stem passes through the end of the elbow and a stuffing box of conventional pattern is applied to the same. A hand wheel is mounted at the outer end of the stem. The inner portion of the stem is provided with a series of spaced annular grooves. A valve disk is positioned upon the inner end of the stem and the said valve disk is provided at one side with an annular boss which receives the end of the stem. Fingers are pivotally mounted upon the valve disk and are provided with inturned ends adapted to engage in one of the grooves of the stem. The outer sides of the said fingers are provided with threads. A nut is screw threaded upon the said fingers and is adapted to force the ends of the same into contact with one of the grooves whereby the valve disk is securely held in position at the inner end of the stem.

In the accompanying drawing:—

Figure 1 is a longitudinal sectional view of the anti-freezing device.

Fig. 2 is a transverse sectional view of the same cut on the line 2—2 of Fig. 1.

Fig. 3 is a transverse sectional view through the stem of the device and looking toward the inner end of the device.

The anti-freezing device comprises a nipple 1 which is provided at a point between its ends with an enlargement 2. The said enlargement 2 is provided with an external thread which may be screwed into an aperture provided in the side of the boiler which is indicated at 3. A spider 4 is located within the nipple 1 at a point between the ends thereof and the said spider carries a bearing 5 which is centrally positioned with relation to the said nipple. A pipe 6 is connected at one end with the outer end of the nipple 1 in a usual manner and the said pipe from the boiler 3 may be downwardly inclined. An elbow 7 is connected with the outer end of the pipe 6 and the said elbow is provided at its lower side and at its lowest point with a drain cock 8 of conventional pattern. A spider 9 is located within the elbow 7 and the said spider carries an annular bearing 10 which is internally screw threaded. A water column pipe 11 is connected with the elbow 7 and is vertically disposed and may be connected with a water gage in a usual manner. A stem 12 traverses the length of the pipe 6 and the lower portion of the elbow 7 and the length of the nipple 1. The inner end of the stem 12 projects beyond the inner end of the nipple 1 and the outer end of the stem 12 projects beyond the outer end of the elbow 7. At the point where the stem 12 passes through the side of the elbow 7 a stuffing box 13 is provided to prevent leakage at that point. A hand wheel 14 is fixed to the outer end of the stem 12. The inner portion of the stem 12 is provided with a number of spaced grooves 15 which extend completely around the said stem. The inner portion of the stem 12 is journaled in the bearing 5 and that portion of the stem 12 which lies in the elbow 7 is provided with a thread 16 which engages the thread in the bearing 10.

A valve is mounted at the inner end of the stem 12. The said valve comprises a disk 17 which is approximately of the same diameter as the inner end of the nipple 1. The said disk 17 carries at one side an annular boss 18 which receives the inner end of the stem 12. Fingers 19 are pivoted upon the disk 17 and the free ends of the said fingers are inturned in order that they may enter one of the grooves 15 of the stem 12. The fingers 19 are provided at their outer sides with threads 20. A nut 21 is adapted to be screwed into engagement with the threads 20 of the fingers 19 whereby the free ends of the said fingers are moved toward each other and securely held in one of the grooves 15 of the stem 12. The stem 12 is provided with a number of the grooves 15 in order that the inner portion of the said stem may be cut off when desired or required in order to conform with the length of the pipe 6.

In view of the fact that the pipe 6 is slightly inclined when the valve disk 17 is moved to a closed position against the end of the nipple 1 by turning the stem 12 the water may be drained from the pipe 6 and from the column 11 by opening the drain cock 8. Thus the pipe 6, column 8 and the water gage cannot retain water which will freeze.

In the event that the device is not drained as hereinbefore indicated and should water be trapped in the pipe 6 and freeze in the form of ice the ice may be broken by turning the stem 12 whereby it will move longitudinally through the ice and break the same sufficiently to permit the water to flow from the boiler into the pipe 6 and pipe 11 and eventually thaw the ice which has formed therein.

From the foregoing description taken in conjunction with the accompanying drawing it will be seen that an anti-freezing device of simple and durable structure is provided and that the same may be used to advantage upon the pipe of a boiler which connects the same with the water gage thereof.

Having described the invention what is claimed is:—

1. A device of the character stated comprising a nipple, a pipe attached to the nipple, an elbow attached to the pipe and adapted to be connected with a gage, a drain provided upon the elbow, bearings located in the elbow and the nipple, a stem journaled in the bearings and adapted to move longitudinally of the pipe and a valve carried by the stem and adapted to close against the end of the nipple.

2. A device of the character stated comprising a nipple, a stem journaled therein and adapted to move longitudinally thereof, a valve disk having a boss which receives the end of the stem, fingers pivoted upon the valve disk and a nut engageable with the fingers to cause the same to engage the stem.

3. A device of the character described comprising a nipple, a bearing located in the nipple, a stem journaled in the bearing and adapted to move longitudinally of the nipple, a disk having a boss which receives the stem, fingers pivoted upon the disk and having threads, and a nut screw threaded upon the fingers.

4. A device of the character described comprising a nipple, a bearing located in the nipple, a stem journaled in the bearing and provided with a series of annular spaced grooves, a disk having an annular boss adapted to receive the end of the stem, fingers pivoted upon the disk and provided with inturned ends adapted to engage one of the grooves of the stem, said fingers being provided at their outer sides with a thread and a nut having an internal thread adapted to engage the threads of the fingers.

In testimony whereof I affix my signature.

JOHN S. WHITTEN.